United States Patent
Ihrig et al.

(10) Patent No.: US 10,626,309 B2
(45) Date of Patent: Apr. 21, 2020

(54) BIODEGRADABLE, PRESSURE-SENSITIVE ADHESIVE BASED ON POLYESTER-POLYURETHANE

(71) Applicant: TESA SE, Norderstedt (DE)

(72) Inventors: Ralf Ihrig, Quickborn (DE); Uwe Schümann, Pinneberg (DE); Manfred Spies, Bad Bramstedt (DE); Kirstin Weiland, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/100,042

(22) PCT Filed: Dec. 15, 2014

(86) PCT No.: PCT/EP2014/077695
§ 371 (c)(1),
(2) Date: May 27, 2016

(87) PCT Pub. No.: WO2015/091325
PCT Pub. Date: Jun. 25, 2015

(65) Prior Publication Data
US 2017/0002238 A1     Jan. 5, 2017

(30) Foreign Application Priority Data

Dec. 16, 2013 (DE) .......... 10 2013 226 031

(51) Int. Cl.
*C09J 175/06* (2006.01)
*C08G 18/66* (2006.01)
(Continued)

(52) U.S. Cl.
CPC .......... *C09J 175/06* (2013.01); *C08G 18/12* (2013.01); *C08G 18/3206* (2013.01);
(Continued)

(58) Field of Classification Search
CPC ... C09J 175/06; C09J 7/0207; C08G 18/4238; C08G 18/4241; C08G 18/4277; C08G 18/3206
See application file for complete search history.

(56) References Cited

U.S. PATENT DOCUMENTS

| 4,331,718 A | 5/1982 | Gleichechagen et al. |
| 4,946,535 A * | 8/1990 | Meckel ............ C08G 18/0804 |
| | | 12/142 F |

(Continued)

FOREIGN PATENT DOCUMENTS

| DE | 2845541 A1 | 6/1980 |
| DE | 19532771 A1 | 3/1997 |

(Continued)

OTHER PUBLICATIONS

JP-2007070422_Mar. 2007_English Translation.*
(Continued)

*Primary Examiner* — Michael L Leonard
(74) *Attorney, Agent, or Firm* — Norris McLaughlin PA (57) ABSTRACT

A biodegradable, pressure sensitive adhesive based on the chemical reaction product of
  one or more aliphatic polyester polyols having a hydroxyl functionality of between >2 and <4;
  one or more aliphatic polyester-polyols having a hydroxyl functionality of between >1 and ≤2;
  one or more chain extenders having dual hydroxyl functionalities and having a molecular weight of ≤200 g/mo; and,
  one or more aliphatic diisocyanates;
characterized in that the ratio of the total number of isocyanate groups to the total number of hydroxyl groups in the materials used to form the reaction product is between ≥0.4 and <1.0, and preferably is between ≥0.6 and ≤0.9.

21 Claims, 1 Drawing Sheet

(51) Int. Cl.
*C08G 18/42* (2006.01)
*C08G 18/76* (2006.01)
*C08G 18/32* (2006.01)
*C08G 18/12* (2006.01)
*C09J 7/38* (2018.01)

(52) U.S. Cl.
CPC ..... *C08G 18/4202* (2013.01); *C08G 18/4238* (2013.01); *C08G 18/4241* (2013.01); *C08G 18/4277* (2013.01); *C08G 18/664* (2013.01); *C08G 18/7671* (2013.01); *C09J 7/38* (2018.01); *C08G 2170/40* (2013.01); *C09J 2475/00* (2013.01)

(56) References Cited

U.S. PATENT DOCUMENTS

| | | | |
|---|---|---|---|
| 5,157,101 A * | 10/1992 | Orr | C08G 18/69 528/74.5 |
| 5,292,560 A | 3/1994 | German | |
| 5,698,621 A | 12/1997 | Nguyen et al. | |
| 2012/0208017 A1* | 8/2012 | Yoshie | C08G 18/4233 428/355 R |

FOREIGN PATENT DOCUMENTS

| | | | |
|---|---|---|---|
| DE | 19722627 C1 | 10/1998 | |
| DE | 10012261 A1 | 9/2001 | |
| DE | 20208094 U1 | 9/2002 | |
| EP | 1849811 A1 | 10/2007 | |
| EP | 1656669 B1 | 10/2008 | |
| EP | 2325220 A1 | 5/2010 | |
| GB | 2128199 A | 4/1984 | |
| GB | 2368300 A | 5/2002 | |
| JP | 63189486 A | 8/1988 | |
| JP | 08157798 A | 6/1996 | |
| JP | 2007070422 A * | 3/2007 | ............ C08G 18/66 |
| JP | 200770422 A | 9/2007 | |
| WO | 9700772 A1 | 1/1997 | |
| WO | 9839157 A1 | 9/1998 | |
| WO | 9914261 A1 | 3/1999 | |
| WO | 0168364 A1 | 9/2001 | |
| WO | 2005017887 A1 | 2/2005 | |

OTHER PUBLICATIONS

German Search Report for corresponding application DE10 2013 226 031.8 dated Aug. 4, 2014.
International Search Report for corresponding application PCT/EP2014/077695 dated Feb. 24, 2015.

* cited by examiner

BIODEGRADABLE, PRESSURE-SENSITIVE ADHESIVE BASED ON POLYESTER-POLYURETHANE

This patent application claims the full priority benefit of PCT/EP2014/077695 filed 15.Dec 2014, and to the earlier filed priority application, DE 10 2013 226 031.8 filed 16.Dec.2013. The entirety of the foregoing documents are herein incorporated by reference.

The invention relates to the composition of a pressure-sensitively adhesive, biodegradable polyester-polyurethane, to a method for producing it, to chemical crosslinking thereof, and to use in an adhesive tape or in a cling film.

Pressure-sensitive adhesiveness is that property of a substance whereby it enters into a permanent bond to a substrate even under relatively weak applied pressure. Substances possessing this quality are identified as pressure-sensitive adhesives (PSAs). PSAs are long-established products. Frequently they can be detached from the substrate again after use, with substantially no residue. PSAs generally at room temperature have a permanent inherent stickiness, thus having a certain viscosity and tack, and so they wet the surface of the respective substrate even under low applied pressure. The capacity of a PSA to adhere to materials and to transmit forces derives from the adhesion capacity and the cohesion of the PSA.

PSAs can be viewed as liquids with extremely high viscosity with an elastic component. Accordingly, PSAs have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence on not only the precise composition, the structure, and the degree of crosslinking of the respective PSA but also on the rate and duration of the deformation, and on the temperature.

The proportional viscous flow is necessary for the achievement of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also to high peel adhesion. Highly crosslinked systems, crystalline polymers, or polymers with glasslike solidification lack flowable components and are therefore in general devoid of tack or at least possess only little tack.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. As a result of these forces of resilience, an adhesive bond is able to withstand a long-term load acting on it, in the form of a long-term shearing load, for example, sufficiently over a relatively long time period.

For the more precise description and quantification of the extent of elastic and viscous components, and also of the proportion of the components to one another, the variables of storage modulus (G') and loss modulus (G") can be employed, as may be determined by means of Dynamic Mechanical Analysis (DMA). G' is a measure of the elastic component, G" a measure of the viscous component, of a substance. Both variables are dependent on the deformation frequency and on the temperature.

The variables can be determined with the aid of a rheometer. In that case, for example, the material under investigation, in the form of a plane-parallel layer, is exposed in a plate/plate arrangement to a sinusoidally oscillating shearing stress. In the case of instruments operating with shear stress control, the deformation is measured as a function of time, and the time offset of this deformation relative to the introduction of shear stress is recorded. This time offset is referred to phase angle δ.

The storage modulus G' is defined as follows: $G'=(\tau/\gamma)*\cos(\delta)$ ($\tau$=shear stress, $\gamma$=deformation, $\delta$=phase angle=phase shift between shear stress vector and deformation vector). The definition of the loss modulus G" is as follows: $G''=(\tau/\gamma)*\sin(\delta)$ ($\tau$=shear stress, $\gamma$=deformation, $\delta$=phase angle=phase shift between shear stress vector and deformation vector).

A substance and the layer produced from it are deemed in general to be pressure-sensitively adhesive, and are defined as pressure-sensitively adhesive for the purposes of this specification, if at room temperature, here by definition at 23° C., in the deformation frequency range from $10^0$ to $10^1$ rad/sec, G' is situated at least partly in the range from $10^3$ to $10^7$ Pa and if G" is likewise at least partly within this range.

Within this range, which in a matrix plot of G' and G" (G' plotted as a function of G") may also be referred to as a viscoelastic window for PSA applications or as a PSA window according to viscoelastic criteria, there are in turn different sectors and quadrants which characterize more closely the PSA properties to be expected from the associated substances. Within this window, substances with high G" and low G' are generally notable, for example, for a high peel adhesion and a low shear strength, whereas substances with high G" and high G' are notable both for high peel adhesion and for high shear strength.

The findings on the correlations between rheology and pressure-sensitive adhesiveness, generally, are state of the art and are described for example in Satas, "Handbook of Pressure Sensitive Adhesive Technology", Third Edition (1999), pages 153 to 203.

One particular form of substances which develop adhesion forms the basis for cling films. Cling films are characterized in that there is little if any perceptible tack, and yet they adhere relatively well to objects having a smooth surface. The adhesion effect is ascribed to electrostatic forces of a traction. With conventional adhesives or PSAs as well, electrostatic forces of a traction play a part, and the chemical compositions of the cling film surfaces are not fundamentally different from those of customary adhesives or PSAs, and for these reasons the differences between a customary PSA surface and a cling film surface must be considered to be gradual in nature. In relation to the viscoelastic window, the adhesion-developing substances of the cling films can in general be classified in the range with low G" and moderate to high G'. Adhesion-developing substances of this kind are identified in this specification as bonding materials. For these materials, G' and G" may also lie outside the limits which characterize the PSAs.

Cling films (also known as static cling films) are widely known. GB 2 128 199 A, for example, proposes polyolefin compositions with possible α-olefin fractions, and WO 98/39157 A1 proposes polyolefin compositions with fractions of styrene block copolymers, for achieving the adhesion properties. Polyolefin compositions and also compositions comprising ethylene-vinyl acetate copolymers are also described in WO 99/14261 A1. WO 98/39157 A1, moreover, mentions different thermoplastic elastomers, such as copolyesters, polyurethanes, and polyamides, for example. EP 1 849 811 B1 proposes crosslinked polyurethanes for producing cling films.

Known from a series of texts are cling films made from plasticized PVC or other plasticized polymers. Examples are found in U.S. Pat. No. 5,698,621 A, GB 2 368 300 A, DE 202 08 094 U, DE 100 12 261 A1, WO 01/68364 A1 or WO 97/00772 A1. Described in U.S. Pat. No. 5,292,560 A are polyethyl acrylate-based cling films.

Cling films are used, for example, as protection for displays or for attaching information to automobile windshields, for price marking, for example.

Thus DE 197 22 627 A1 proposes the use of a cling film for fixing magnetic-strip cards or chip cards to a base, particularly to a sheet of paper.

EP 1 656 669 A1 proposes the use of a cling film for fixing and at the same time hiding and protecting optical storage media.

A bonding material or pressure-sensitive adhesive is chemically crosslinked when the bonding material or PSA has achieved, through chemical reaction with a crosslinker, a condition which renders it no longer meltable and no longer soluble in organic solvents. Liquification is then possible only through decomposition, which is irreversible. Crosslinkers contemplated include all substances which have a functionality of at least two and which are able to enter into chemical crosslinking reactions with the functional groups of the bonding material or PSA. Crosslinkers are selected according to the functional groups of the bonding material or PSA. Bonding materials or PSAs which carry carboxyl groups are crosslinked typically with di- or polyepoxides, possibly with additional catalysis, through tertiary amines, for example, or else with metal acetylacetonates, metal alkoxides, and alkoxy-metal acetylacetonates. For the crosslinking of bonding materials or PSAs which carry hydroxyl groups, for example, di- or polyisocyanates are appropriate.

Polymers or prepolymers which possess the property of being meltable and therefore thermoplastically processable are referred to in this specification—as customary in the terminology of the skilled person—as hotmelts.

A polyurethane hotmelt prepolymer is understood in this specification to be a reaction product, more particularly a meltable reaction product, which is obtained by chemical reaction of two or more polyols with one or more polyisocyanates and which at room temperature has solidity and dimensional stability such that in known mixing assembles at room temperature, its continuous, homogeneous mixing with other substances, and also, in particular, its shaping or similar steps of processing, are not possible without the polyurethane hotmelt prepolymer heating up or without the addition of solvents, diluents or other viscosity-lowering additives being necessary. Examples of known mixing assemblies are compounders, internal mixers, extruders, planetary roller extruders, planetary mixers, butterfly mixers, or dissolvers. For the purposes of this specification, a polyurethane hotmelt prepolymer can be processed only when the polyurethane hotmelt prepolymer is dissolved in a solvent or if it is heated, in which case the heat may be supplied from the outside, by heating, or may be generated by shearing. Typical processing temperatures for polyurethane hotmelt prepolymers for the purposes of this specification are in the range from 70° to 160° C., and are at least 40° C. Room temperature is understood in this specification to be 23° C. Melting in this sense does not necessarily mean that at the moment of the transition from the solid, dimensionally stable state to the liquefied, miscible state, it is necessary for a crystalline melting temperature or a glasslike solidification temperature to be exceeded. What is meant at this point is a sufficient lowering of the viscosity.

A polyurethane hotmelt prepolymer for the purposes of this specification has a complex viscosity—as measured with a rheometer in an oscillation test with a sinusoidally oscillating shearing stress in a plate/plate arrangement at a temperature of 23° C. and with an oscillation frequency of 10 rad/s—of at least 1000 Pa*s, preferably at least 3000 Pa*s.

The complex viscosity $\eta^*$ is defined as follows: $\eta^* = G^*/\omega$ ($G^*$=complex shear modulus, $\omega$=angular frequency).

The further definitions are as follows: $G^* = \sqrt{(G')^2 + (G'')^2}$ ($G''$=viscosity modulus (loss modulus), $G'$=elasticity modulus (storage modulus)).

$G'' = (\tau/\gamma) \cdot \sin(\delta)$ ($\tau$=shear stress, $\gamma$=deformation, $\delta$=phase angle=phase shift between shear stress vector and deformation vector).

$G' = (\tau/\gamma) \cdot \cos(\delta)$ ($\tau$=shear stress, $\gamma$=deformation, $\delta$=phase angle=phase shift between shear stress vector and deformation vector).

$\omega = 2\pi \cdot f$ (f=frequency).

Adhesive tapes which are furnished with pressure-sensitive adhesives, known as pressure-sensitive adhesive (PSA) tapes, are nowadays widely used in the industrial and private spheres. PSA tapes consist customarily of a backing film, furnished on one or both sides with a PSA. There are also PSA tapes consisting exclusively of a layer of PSA and no backing film, such tapes being called transfer tapes. The composition of the PSA tapes may vary greatly and is guided by the particular requirements of the various applications. The backings consist customarily of polymeric films such as, for example, polypropylene, polyethylene, polyester, or else of paper or woven or nonwoven fabric.

The PSAs consist customarily of acrylate copolymers, silicones, natural rubber, synthetic rubber, styrene block copolymers, or polyurethanes.

On the basis of environmental considerations there has for a number of years been an effort underway to design plastics in such a way that they are biodegradable. In the packaging and transport protection sectors, in particular, biodegradable plastics harbor a great potential for reducing the waste volume made up of non-rotting plastics.

The term "biodegradable polymers" is used for natural and synthetic polymers which have plastics-like qualities (notched impact strength, thermoplastifiability) but which, in contrast to conventional plastics, are degraded by a multiplicity of microorganisms in a biologically active environment (compost, digested sludge, soil, wastewater); this does not necessarily take place under customary household conditions (garden composting). One definition of biodegradability is given in European Standard DIN EN 13432 (biodegradation of packaging) and DIN EN 14995 (compostability of plastics).

The skilled person makes a distinction between disintegration and biodegradability. Disintegration refers to physical breakdown into very small fragments.

Determining the disintegrability (the degree of disintegration) of polymers under modeled composting conditions on a laboratory scale is described in texts including DIN EN ISO 20200. In that case, the sample under analysis is stored in a defined plastic solids waste system at 58±2° C. for at least 45 and not more than 90 days. Thereafter the entire sample is passed through a 2 mm sieve and the degree of disintegration D is determined as follows:

$$D = \frac{m_i - m_r}{m_i} \times 100$$

Here $m_i$ is the initial dry mass of the sample material $m_r$ is the dry mass of the residual sample material obtained by sieving Biodegradability is understood in general as the breakingdown of a chemical compound or of an organic material by microorganisms in the presence of oxygen into carbon dioxide, water, and salts of other elements present (mineralization), with formation of new biomass, or, in the absence of oxygen, into carbon dioxide, methane, mineral salts, and new biomass. Biodegradation is accomplished outside and/or inside the cell by bacteria, fungi, and microorganisms, and also their enzymes.

The degradation process may be divided into two component steps. Beginning first of all is the hydrolysis reaction, triggered by enzymes and the presence of water. Where hydrolytically unstable bonds are present, they are degraded. In the most favorable scenario, the products of lysis undergo disintegration, through the concluding disintegration process, to form harmless by-products. At the end there is complete metabolization of the starting materials into $CO_2$, $H_2O$, and biomass.

The biodegradability of packing materials is governed in terms of standards by DIN EN 13432 "Requirements for packaging recoverable through composting and biodegradation". In this context, the material for testing is subjected to an aerobic degradation test in accordance with ISO 14855: 1999 *"Determination of the ultimate aerobic biodegradability of plastic materials under controlled composting conditions"* and a degree of degradation of at least 90% must be achieved in comparison to a suitable reference substance within not more than six months. The degree of degradation here is determined by the measured evolution of carbon dioxide. After comminution, the sample is stored with vermiculite or highly functional aerated compost as inoculum in a vessel equipped with air supply at 58±2° C., and the evolution of $CO_2$ is recorded on an ongoing basis. In view of the complexity of apparatus, there are a number of testing institutes which have specialized in the testing and which subsequently issue a corresponding certificate, such as, for instance, OK compost from Vinçotte.

After the end of the testing, the degradation rate $D_t$ is obtained as:

$$D_t = \frac{(CO_2)_T - (CO_2)_B}{ThCO_2} \times 100$$

Here $(CO_2)_T$ is the cumulative amount of carbon dioxide formed in each composting vessel containing the test substance, in grams per vessel $(CO_2)_B$ is the average cumulative amount of carbon dioxide formed in the control vessels, in grams per vessel $ThCO_2$ is the theoretical amount of carbon dioxide which the test substance can form, in grams per vessel In addition to the biodegradability, DIN EN 13432 also includes a test for determining the quality of the compost produced as a result of degradation. This compost must not have any adverse effects on plant growth.

Generally speaking, biodegradable components also have a high disintegration rate, whereas the disintegration of a material does not automatically imply its biodegradability. Very frequently, however, it is the case, and so the disintegration test can be regarded as a suitable preliminary test, with the advantage of being less costly and complex in terms of apparatus and time.

In view of the fact that environmental considerations relating to biodegradability are playing an ever more important part not least for pressure-sensitive adhesive tapes, the past has also seen the presentation of PSA tapes which use biodegradable films as backing material. The films used are frequently based on compounds of polylactic acid. Like other biodegradable thermoplastic polymers suitable for application, polylactic acid is relatively hard and brittle. In order to be suitable for film applications, these biodegradable polymers contemplated must be compounded with softer polymers, which in many cases lack or have poorer biodegradability.

In terms of the PSAs, the possibilities are further restricted. PSAs are amorphous materials with a low glass transition point.

The conventional scaffold polymers such as natural rubber, styrene block copolymers or polyacrylates are not biodegradable in accordance with the standards which apply in Europe, such as DIN EN 13432, for example. The same is true of the customary tackifier resins such as rosin derivatives, hydrocarbon resins or terpene-phenolic resins. Silicone PSAs are out of the question entirely, on account of their excellent stability with respect to aging. A criterion of biodegradability is customarily the presence of heteroatoms in the main carbon chain. A chemical bond between a carbon atom and a heteroatom such as oxygen or nitrogen, for example, is less stable and hence more amenable to biological degradation than is a bond between two carbon atoms.

In view of these circumstances, polyester PSAs are appropriate for such applications. A frequent disadvantage of polyester PSAs is that the contact peel adhesion of these adhesive systems is at a relatively low level. The addition of customary compatible tackifiers such as adhesive resins, for example, would provide a remedy here, but on the other hand would cause the biodegradability to deteriorate.

JP 2007 070 422 A1 describes a biodegradable PSA based on a polyester polyurethane which, however, has a low melting point and hence the disadvantage of lacking dimensional stability at room temperature unless it is crosslinked. With regard to continuous coating, which generally constitutes the central operating step in customary adhesive tape manufacture, reactive systems which lack dimensional stability have the disadvantage that in this state they cannot, or at least not with constant layer thickness, be wound up on a backing material, especially not if the layer thicknesses are high. With constant layer thickness it is possible to wind up only those polymer films which are also dimensionally stable under the pressure which comes about on the inside of a roll of adhesive tape when being wound. Moreover, JP 2007 070 422 A1 does not teach how a biodegradable PSA must be formulated in order to be suitable for adhesive bonding applications associated with transport protection, especially where the temporary bonding is on sensitive surfaces. In such applications, an important factor is the ease of redetachability, especially residue-less redetachability, in conjunction with sufficient bonding performance. Redetachability must be residue-free even after prolonged storage times at relatively high temperatures and also after storage under hot, humid conditions. Indications as to how this may be achieved are not provided in JP 2007 070 422 A1.

JP 63 189 486 A discloses a moisture-curing PSA based on a polyester polyurethane. Moisture-curing PSAs are problematic for use in adhesive tapes, where effective protection from ingress of moisture prior to application is a necessity.

JP 08 157 798 A proposes reacting a liquid polycaprolactone diol and a dicarboxylic acid with di- or polyisocyanates to give a PSA. PSAs composed only of difunctional NCO-reactive units generally have the disadvantage that for many applications they cannot be used to achieve a combination of sufficiently high shear strength (cohesion) and sufficiently high peel adhesion. Moreover, JP 08 157 798 A does not solve the problem of simultaneously chemically crosslinking a biodegradable PSA while realizing a high coating speed. Since in JP 08 157 798 A the solidification is coupled to the progress of the chemical reaction to form the polyurethane, a certain time is required until a product of this kind can be wound. Accordingly, the coating speed of such systems is limited.

The problem addressed by the invention is that of providing a remedy here and of showing a possible way to make PSAs accessible for technical applications that exhibit the profile of properties of conventional PSAs and that are biodegradable. Particularly in relation to their technical adhesive properties, the PSAs are to be widely adjustable, and are to be able to be configured in such a way that both high cohesion and high adhesion capability can be achieved. In particular they are also able to be formulated in such a way that they possess good shear strength. However, it is also to be possible to formulate them such that they can be detached easily and without residue from the substrate and such that they have very little, if any, perceptible stickiness (tack). Easy and residue-free detachability is also to be possible even when the bonded specimens have been stored beforehand under hot and humid conditions, as for example at 40° C. and 98% relative humidity for 7 days, or under hot conditions, as for example at 60° C. for three weeks. They are to be chemically crosslinkable as and when required. Moreover, they are advantageously to be amenable to production in a continuous coating operation without any need to have to wait for chemical reaction progress until the PSA has solidified sufficiently to be able to be wound. It ought, accordingly, to be possible to formulate the PSAs in such a way that even before the onset of a crosslinking reaction, they have sufficiently high viscosity to be able to be wound up on a release liner or on a backing material in a continuous coating operation without PSA material being squeezed out at the edge of the release liner or backing material in the course of winding.

This problem is solved by means of a pressure-sensitive adhesive (PSA) as recorded in the main claim. Dependent claims provide advantageous developments of the subject matter of the invention. The invention further encompasses the use of this PSA.

The invention accordingly relates to a pressure-sensitively adhesive, biodegradable, chemical reaction product of
- at least one or more aliphatic polyester polyols having a hydroxyl functionality of in each case between greater than two and less than four
- at least one or more aliphatic polyester polyols having a hydroxyl functionality of in each case between less than or equal to two and greater than one
- at least one or more in each case dual hydroxyl-functionalized chain extenders having a molecular weight of in each case less than or equal to 200 g/mol, and
- at least one or more aliphatic diisocyanates, characterized in that
the ratio of the total number of isocyanate groups to the total number of hydroxyl groups in the substances introduced for the chemical reaction to give the pressure-sensitively adhesive, biodegradable, chemical reaction product is between greater than or equal to 0.4 and less than 1.0, preferably between greater than or equal to 0.6 and less than or equal to 0.9.

The hydroxyl functionality is understood as the number of hydroxyl groups per molecule of a polyol or chain extender. In this specification, in the case of a polyester polyol, it is expressed relative to the number-averaged average molecular weight of the respective polyester polyol, and is calculated according to the following formula:

$$f = M_n \text{ [g/mol]} \times \text{OHN [mmol OH/kg]}/10^6$$

f is the hydroxyl functionality. $M_n$ is the number-averaged average molecular weight of the respective polyester polyol in the unit [g/mol] and OHN is the hydroxyl number of the polyester polyol in the unit [mmol OH/kg].

The hydroxyl number is a measure of the amount of hydroxyl groups in a polyol.

The hydroxyl number is determined here according to DIN 53240. According to that method, the hydroxyl number (OHN) is expressed in the unit [mg KOH/g]. It corresponds to the amount of KOH in [mg] which is equivalent to the amount of acetic acid bound in the acetylation of 1 g of polyol. For simplification of formula calculations, the hydroxyl number in this specification is converted into the unit [mmol OH/kg].

This is done according to the following formula:

$$\text{OHN [mmol OH/kg]} = \text{OHN [mg KOH/g]} \times 1000/56.1$$

where 56.1 is the molar mass of KOH.

An aliphatic polyester polyol for the purposes of this specification is an acyclic or cyclic, saturated or unsaturated polyester polyol which contains no aromatic rings in its chemical structure.

Suitable polyester polyols include all commercial aliphatic polyester polyols. Polyester polyols are obtained generally by polycondensation of diols or triols or higher-functionality alcohols and dicarboxylic acids or, in the case of polycaprolactone polyols, by ring-opening polymerization from ε-caprolactone and a starter molecule having a functionality of two or three or higher.

With regard to the dicarboxylic acid unit of the polyester polyols, adipic acid is preferred. Preferred polyester polyols are therefore polyadipate polyols. Likewise preferred are polycaprolactone polyols.

With regard to the diol, triol or higher-functionality alcohol unit of the polyester polyols, ethylene glycol or diethylene glycol are preferred. With particular preference at least one of the aliphatic polyester polyols is a polyadipate polyol comprising ethylene glycol or diethylene glycol as monomer unit.

1,4-Butanediol and 1,6-butanediol are likewise suitable. Mixtures of the stated diols are highly suitable as well. Carbonate groups contained in the polyester polyol are likewise advantageous. Disadvantageous in terms of achieving rapid biodegradability are polyester polyols with a functionality of three or more, and also polyester polyols which carry methyl groups, in other words polyester polyols which include, for example, 2-methyl-1,3-propanediol, 3-methyl-1,5-pentanediol or neopentyl glycol as their alcohol unit. Surprisingly, and also unforseeably for the skilled person, the pressure-sensitively adhesive, chemical reaction product of the invention is biodegradeable in spite of the incorporation of such disadvantageous polyester polyols, which may possibly be necessary in order to achieve the desired PSA performances, in combination with the other components.

Preferred chain extenders are 2-methyl-1,3-propanediol (CAS No.: 2163-42-0), 3-methyl-1,5-pentanediol (CAS No.: 4457-71-0), ethylene glycol (CAS No.: 107-21-1) or, more preferably, diethylene glycol (CAS No.: 111-46-6), triethylene glycol (CAS No.: 112-27-6) or tetraethylene glycol (CAS No.: 112-60-7). Also highly suitable are propylene glycol, dipropylene glycol, tripropylene glycol, 1,3-propanediol, 1,3-butanediol, 1,4-butanediol, neopentyl glycol, 1,6-hexanediol, 2-ethyl-1,3-hexanediol, and 2-butyl-2-ethyl-1,3-propanediol. This enumeration should not be understood as exhaustive. Other known chain extenders having a molecular weight of less than or equal to 200 g/mol are not excluded from the concept of the invention.

Diisocyanates used are aliphatic diisocyanates. Aliphatic diisocyanates for the purposes of this specification are acyclic or cyclic, saturated or unsaturated diisocyanates which contain no aromatic rings in their chemical structure.

In a very advantageous embodiment at least one of the aliphatic diisocyanates is 4,4'-diisocyanatodicyclohexylmethane, abbreviated to $H_{12}MDI$ (CAS No.: 5124-30-1), or hexamethylene diisocyanate, abbreviated to HDI (CAS No.: 822-06-0). Particularly preferred with regard to the rapidity of biodegradability is 4,4'-diisocyanatodicyclohexylmethane.

1-Isocyanatomethyl-3-isocyanato-1,5,5-trimethylcyclohexane (isophorone diisocyanate) may likewise be used:

Further examples of suitable diisocyanates are:

Butane 1,4-diisocyanate, tetramethoxybutane 1,4-diisocyanate, ethylene diisocyanate, 2,2,4-trimethylhexamethylene diisocyanate, ethylethylene diisocyanate, 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, and norbornane diisocyanatomethyl.

In one advantageous embodiment the ratio of the total number of isocyanate groups to the total number of hydroxyl groups in the substances introduced in the chemical reaction to give the pressure-sensitively adhesive, biodegradable, chemical reaction product is between greater than or equal to 0.6 and less than or equal to 0.9.

With further preference the pressure-sensitively adhesive, biodegradable, chemical reaction product is a hydroxyl-functionalized polyurethane hotmelt prepolymer.

According to a further, preferred embodiment of the pressure-sensitively adhesive, biodegradable, chemical reaction product, at least one of the aliphatic polyester polyols has a hydroxyl number of between greater than or equal to 200 mmol OH/kg and less than or equal to 2000 mmol OH/kg. This corresponds in the case of polyester diols to a number-averaged average molecular weight between 1000 and 10 000 g/mol and in the case of polyester triols to between 1500 and 15 000 g/mol.

With further preference at least one of the aliphatic polyester polyols having a hydroxyl functionality of between greater than two and less than four has a hydroxyl number of between greater than or equal to 200 mmol OH/kg and less than or equal to 2000 mmol OH/kg.

With further preference, the percentage of hydroxyl groups originating from the aliphatic polyester polyols having a hydroxyl functionality of between greater than two and less than four is at least 2.5%, preferably at least 5%, more preferably at least 7.5% of all hydroxyl groups introduced for forming the pressure-sensitively adhesive, biodegradable, chemical reaction product.

In one particularly advantageous embodiment
- at least one of the aliphatic polyester polyols has a hydroxyl functionality of between greater than two and less than four and a hydroxyl number of between greater than or equal to 200 mmol OH/kg and less than or equal to 2000 mmol OH/kg and
- at least one of the aliphatic polyester polyols has a hydroxyl functionality of between less than or equal to two and greater than one and a hydroxyl number of between greater than or equal to 200 mmol OH/kg and less than or equal to 8000 mmol OH/kg, and the percentage of hydroxyl groups originating from the aliphatic polyester polyols having a hydroxyl functionality of between greater than two and less than four and a hydroxyl number of between greater than or equal to 200 mmol OH/kg and less than or equal to 2000 mmol OH/kg is between 2.5% inclusive and 50% inclusive, preferably between 5.0% inclusive and 40% inclusive, more preferably between 7.5% inclusive and 30% inclusive of all hydroxyl groups introduced for forming the pressure-sensitively adhesive, biodegradable, chemical reaction product.

In a further, particularly advantageous embodiment
- at least one of the aliphatic polyester polyols has a hydroxyl functionality of between greater than two and less than four and a hydroxyl number of between greater than or equal to 200 mmol OH/kg and less than or equal to 2000 mmol OH/kg and
- at least one of the aliphatic polyester polyols has a hydroxyl functionality of between less than or equal to two and greater than one and a hydroxyl number of between greater than or equal to 200 mmol OH/kg and less than or equal to 2000 mmol OH/kg, and the percentage of hydroxyl groups originating from the aliphatic polyester polyols having a hydroxyl functionality of between greater than two and less than four and a hydroxyl number of between greater than or equal to 200 mmol OH/kg and less than or equal to 2000 mmol OH/kg is between 2.5% inclusive and 50% inclusive, preferably between 5.0% inclusive and 40% inclusive, more preferably between 7.5% inclusive and 30% inclusive of all hydroxyl groups introduced for forming the pressure-sensitively adhesive, biodegradable, chemical reaction product.

The pressure-sensitively adhesive, biodegradable, chemical reaction product is a chemically branched, but noncrosslinked, pressure-sensitive adhesive (PSA) or bonding material and in one advantageous embodiment can be chemically crosslinked to form the PSA or bonding material.

The chemical crosslinking of the pressure-sensitive adhesive, biodegradable, chemical reaction product of the invention is accomplished advantageously by reacting the pressure-sensitively adhesive, biodegradable, chemical reaction product with a diisocyanate, triisocyanate or higher-functionality isocyanate or with a mixture of said isocyanates, the ratio of the total number of all isocyanate groups to the total number of all hydroxyl groups in the substances introduced overall in the chemical reaction to give the pressure-sensitively adhesive, biodegradable, chemical reaction product and in the subsequent chemical crosslinking to give the biodegradable pressure-sensitive adhesive or bonding material being less than 1.0, preferably less than 0.95, more preferably less than or equal to 0.9.

Isocyanates particularly advantageous for the crosslinking step are HDI trimers comprising isocyanurate rings, an example being Desmodur® N 3300 from Bayer, which additionally comprises pentamers, heptamers, and fractions of higher functionality as well. HDI dimers comprising uretdione rings, such as Desmodur® N 3400 from Bayer, for example, which also comprises trifunctional components as well, are likewise suitable. Also suitable are mixtures of the stated isocyanates and also mixtures with other di- or polyisocyanates.

Advantageous for the chemical reaction to give the pressure-sensitively adhesive, biodegradable product of the invention and also for the crosslinking step as well is the use of a bismuth carboxylate-containing or bismuth carboxylate derivative-containing catalyst or catalyst mixture that is known, when used, to accelerate polyurethane reactions. A catalyst of this kind considerably steers the pressure-sensitive adhesion properties of the polyurethane in such a way that the pressure-sensitive adhesion properties can be given a surface-specific selectivity. Examples of bismuth carboxylates are bismuth trisdodecanoate, bismuth trisdecanoate, bismuth trisneodecanoate, bismuth trisoctanoate, bismuth trisisooctanoate, bismuth trishexanoate, bismuth trispentanoate, bismuth trisbutanoate, bismuth trispropanoate or bismuth trisacetate.

It is also possible, however, to use all other catalysts known to the skilled person, such as tertiary amines or organotin compounds, for example.

With further preference the polyols and/or chain extenders are produced from renewable raw materials sources such as, for example, by fermentation of starch or sugar.

In order to adapt the properties of the pressure-sensitively adhesive, chemical reaction product of the invention, the polyurethane can be mixed with one or more additives such as tackifiers (tackifying resins), plasticizers and/or aging inhibitors.

The polyurethane preferably has no additives such as tackifiers (tackifier resins), plasticizers and/or aging inhibitors, more particularly no tackifiers (tackifier resins) and/or plasticizers.

The designation "tackifier resin" is understood by the skilled person to refer to a resin-based substance which enhances the tack.

Tackifiers are, for example, hydrocarbon resins (for example, polymers based on unsaturated $C_5$ or $C_9$ monomers), polyterpene resins based on α-pinene and/or β-pinene and/or δ-limonene, aromatic resins such as coumarone-indene resins, or resins based on styrene or α-methylstyrene, and also rosin and its derivatives, examples being disproportionated, dimerized or esterified resins, as for example reaction products with glycol, glycerol or pentaerythritol, to name but a few. The addition of tackifiers in small amounts of up to 1 wt % is possible without losing the biodegradability of the pressure-sensitively adhesive, chemical reaction product.

In the case of more substantial amounts added to the pressure-sensitively adhesive, chemical reaction product, however, it is possible that the pressure-sensitively adhesive, chemical reaction product will no longer be biodegradable.

In accordance with the invention, therefore, tackifiers are advantageously not used.

Examples of suitable miscible plasticizers are aliphatic, cycloaliphatic, and aromatic mineral oils, polyethylene glycol or polypropylene glycol, diesters or polyesters of phthalic acid, citric acid, trimellitic acid or adipic acid, liquid rubbers (for example, low molecular mass nitrile rubbers or polyisoprene rubbers), liquid polymers of butene and/or isobutene, acrylic esters, polyvinyl ethers, liquid resins and soft resins based on the raw material of tackifier resins, wool wax and other waxes, or liquid silicones. Particular preference is given to using plasticizers comprising renewable raw materials, such as the biobased polyoxytrimethylene glycol Cerenol® from DuPont, for example, to vegetable oils and preferably refined vegetable oils such as, for example, rapeseed oil, soybean oil, fatty acids or fatty acid esters, or epoxidized vegetable oils, such as epoxidized soybean oil. Used more particularly are biodegradable plasticizers, preferably diesters or polyesters of citric acid or of adipic acid.

With further preference the plasticizer, more particularly the biodegradable plasticizer, is used in amounts of up to 10 wt % (based on the overall composition), very preferably in amounts of up to 5 wt % (based on the overall composition), and especially preferably in amounts of up to 2.5 wt % (based on the overall composition).

As for the tackifiers, the addition of any plasticizer in small amounts of up to 1 wt % is possible without loss of the biodegradability of the pressure-sensitively adhesive, chemical reaction product.

Here again it is the case that in the case of more substantial amounts added to the pressure-sensitively adhesive, chemical reaction product, it is possible that the pressure-sensitively adhesive, chemical reaction product will no longer be biodegradable. In accordance with the invention, therefore, plasticizers are advantageously not used, or else, preferably, biodegradable plasticizers are used.

Further possible additives in the pressure-sensitively adhesive, chemical reaction product are fillers (for example, fibers, carbon black, zinc oxide, titanium dioxide, chalk, solid or hollow glass beads, microballoons, microbeads of other materials, silica, silicates, nanoparticles), compounding agents and/or aging inhibitors in the form, for example, of primary and secondary antioxidants, examples being sterically hindered phenols such as Irganox 1010 and more preferably tocopherol (vitamin E). Light stabilizers as well may be added to the PSA.

For the additives, the comments made above with regard to the tackifiers and plasticizers apply: in small amounts of up to 1 wt %, the addition even of nonbiodegradable fillers is possible, without loss of the biodegradability of the pressure-sensitively adhesive, chemical reaction product.

In the case of more substantial amounts added to the pressure-sensitively adhesive, chemical reaction product, it is again possible that the PSA will no longer be biodegradable.

In accordance with the invention, therefore, fillers, especially those that are not biodegradable, are advantageously not used.

Biodegradable fillers, in contrast, can be used even in relatively large amounts.

Lastly, the pressure-sensitively adhesive, biodegradable, chemical reaction product of the invention or the chemically crosslinked PSA or bonding material is produced solventlessly or in an organic solvent or in an aqueous medium.

The pressure-sensitively adhesive, biodegradable, chemical reaction product of the invention or the chemically crosslinked PSA or bonding material, in the form of a pressure-sensitive adhesive film for use as part of an adhesive tape or a cling film, may be produced by customary coating methods known to the skilled person. In this case, the pressure-sensitively adhesive, biodegradable, chemical reaction product of the invention, including the additives and, where appropriate, the crosslinking component, in solution in a suitable solvent, may be coated onto a carrier film or release film by means, for example, of engraved-roller application, comma bar coating, multiroll coating, or in a printing process, and then the solvent can be removed in a drying tunnel or drying oven. Alternatively, the carrier film or release film may also be coated in a solventless process. For this purpose, the pressure-sensitively adhesive, biodegradable, chemical reaction product of the invention is conveyed from an extruder onto a carrier film or release film. Further operating steps may take place in the extruder, such as mixing with the additives described and, optionally, with the crosslinking component, or else filtration or degassing. The melt is then coated, advantageously by means of a slot die, onto the carrier film or release film.

On the basis of the advantages outlined, the pressure-sensitively adhesive, biodegradable, chemical reaction product of the invention or the chemically crosslinked pressure-sensitive adhesive or bonding material, obtained by chemical crosslinking of the pressure-sensitively adhesive, biodegradable, chemical reaction product of the invention, is used in a single-sided or double-sided pressure-sensitive adhesive tape or in a single-sidedly or double-sidedly adhering cling film.

Carrier materials used for the PSA tape are the carrier materials customary and familiar to the skilled person, such as paper, woven or nonwoven fabric, or foils, made for example from polyester such as polyethylene terephthalate (PET), polyethylene, polypropylene, oriented polypropylene, polyvinyl chloride. Particular preference is given to using carrier materials made from renewable raw materials, such as paper, woven fabrics made, for example, from cotton, hemp, jute, stinging nettle fibers, or films made, for example, from polylactic acid, cellulose, modified starch, polyhydroxyalkanoate, biobased polypropylene, biobased polyethylene. Biodegradable carrier materials are particularly preferred. This enumeration should not be taken as being exhaustive; instead, within the bounds of the invention, the use of other films is also possible.

The carrier material may be furnished preferably on one or both sides with the pressure-sensitively adhesive, biodegradable, chemical reaction product of the invention or with the chemically crosslinked PSA or bonding material.

The PSA tape is formed by application to the carrier, partially or over the whole area, of the pressure-sensitively adhesive, biodegradable, chemical reaction product of the invention or the chemically crosslinked PSA or bonding material. Coating may also take place in the form of one or more stripes in lengthwise direction (machine direction), optionally in transverse direction (cross direction), but more particularly takes place over the whole area. Furthermore, the pressure-sensitively adhesive, biodegradable, chemical reaction product of the invention or the chemically crosslinked PSA or bonding material may be applied in patterned dot format by means of screen printing, in which case the dots of adhesive may also differ in size and/or distribution, or by gravure printing of lines which join up in the lengthwise and transverse directions, by engraved-roller printing, or by flexographic printing. The pressure-sensitively adhesive, biodegradable, chemical reaction product of the invention or the chemically crosslinked PSA or bonding material may be present in the form of domes (produced by screen printing) or else in another pattern such as lattices, stripes, zigzag lines. Furthermore, for example, it may also have been applied by spraying, producing a more or less irregular pattern of application.

The coat weight (coating thickness) of the pressure-sensitively adhesive, biodegradable, chemical reaction product of the invention or the chemically crosslinked PSA or bonding material is preferably between 10 and 200 $g/m^2$, more preferably between 25 and 75 $g/m^2$, very preferably between 30 and 50 $g/m^2$.

It is advantageous to use an adhesion promoter, referred to as a primer coat, between carrier film and the pressure-sensitively adhesive, biodegradable, chemical reaction product of the invention or the chemically crosslinked PSA or bonding material, or to use a physical pretreatment of the carrier film surface in order to improve the adhesion of the pressure-sensitively adhesive, biodegradable, chemical reaction product of the invention or of the chemically crosslinked PSA or bonding material to the carrier film.

Primers which can be used are the known dispersion-based and solvent-based systems, based for example on isoprene- or butadiene-containing rubber, acrylate rubber, polyvinyl, polyvinylidene and/or cyclo rubber. Isocyanates or epoxy resins as additives improve the adhesion and in some cases also increase the shear strength of the PSA. The adhesion promoter may likewise be applied to the carrier film by means of a coextrusion layer. Examples of suitable physical surface treatments are flaming, corona or plasma, or coextrusion layers.

Furthermore, the carrier material, on the reverse or upper face, in other words opposite the PSA side, may have been subjected to an antiadhesive physical treatment or coating, more particularly furnished with a parting or release agent (optionally blended with other polymers).

Examples are stearyl compounds (for example, polyvinylstearylcarbamate, stearyl compounds of transition metals such as Cr or Zr, ureas formed from polyethyleneimine and stearyl isocyanate) or polysiloxanes. The term "stearyl" stands as a synonym for all linear or branched alkyls or alkenyls having a C number of at least 10 such as octadecyl, for example.

Suitable release agents further comprise surfactant-type release systems based on long-chain alkyl groups, such as stearyl sulfosuccinates or stearyl sulfosuccinamates, but also polymers, which may be selected from the group consisting of polyvinylstearylcarbamates such as, for example, Escoat 20 from Mayzo, polyethyleneimine-stearylcarbamides, chromium complexes of $C_{14}$ to $C_{28}$ fatty acids, and stearyl copolymers, as described in DE 28 45 541 A, for example. Likewise suitable are release agents based on acrylic polymers with perfluorinated alkyl groups, silicones based, for example, on poly(dimethylsiloxanes), or fluorosilicone compounds.

The carrier material may further be pretreated and/or aftertreated. Common pretreatments are hydrophobizing; customary aftertreatments are calendering, heating, laminating, diecutting, and enveloping.

The PSA tape may likewise have been laminated with a commercial release film, consisting customarily of a base material of polyethylene, polypropylene or polyester that has been coated on one or both sides with polysiloxane, or may have been furnished with a release paper coated on one or both sides with polysiloxane.

The general expression "adhesive tape" or "pressure-sensitive adhesive (or PSA) tape" in the sense of this invention encompasses all sheetlike structures such as two-dimensionally extended films or film sections, tapes with extended length and limited width, tape sections, diecuts, labels, and the like.

The adhesive tape may be made available in fixed lengths such as, for example, as product by the meter, or else as continuous product on rolls (Archimedean spiral).

The adhesive tape may consist of just one layer of adhesive, in other words may be single-ply; alternatively, the adhesive tape may have a carrier, with a layer (or optionally two or more layers) of adhesive applied to one or both sides of this carrier.

Peel adhesion and shear strength of the PSA tape may be adjusted in a targeted way and adapted to the application-specific requirements, within the bandwidth of the invention, through the precise selection of the substances, and their proportions, described for the chemical reaction to give the pressure-sensitively adhesive, biodegradable product of the invention or to give the chemically crosslinked PSA or bonding material. Typical peel adhesion values on a steel substrate or on the plastic ABS, for formulations envisaged for the target application of a transport protection film, are between 0.01 N/cm and 2.0 N/cm. In this case a shear strength in the static shearing test of greater than 10 000 minutes is achieved at room temperature under a load of 1 kg. The PSA coat weight is in each case 50 g/m$^2$ and the bonding area is in each case 13×20 mm$^2$. The carrier film used here is a polyester film 36 μm thick.

These values are also achieved after storage at 60° C. for 3 weeks, and also after storage over 7 cycles of climatic cycling, each cycle consisting of 8 hours at 40° C. and 98% relative humidity and 16 hours at 23° C. and 98% relative humidity.

The PSA tapes of the invention can be peeled without residues or deposits and without discolorations from the aforementioned steel and ABS substrates, not only shortly after bonding but also after the temperature storage and climatic cycling storage procedures specified above.

Disintegration for the pressure-sensitively adhesive, biodegradable, chemical reaction product of the invention and also for the chemically crosslinked PSA or bonding material of the invention is obtained in a commercial compost in accordance with DIN EN ISO 20200 after a composting time of less than 90 days. There is also biological degradation in accordance with DIN EN 13432 after a composting time of less than 6 months.

Further details, objectives, features, and advantages of the present invention are elucidated in more detail below with reference to preferred working examples, without thereby wishing in any way to restrict the invention. In the drawing

Figure 1:
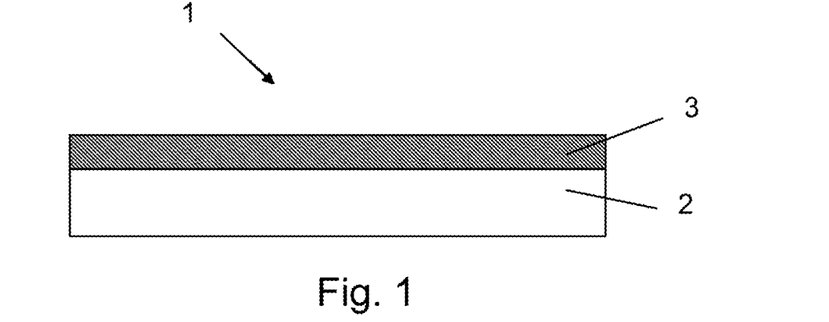
FIG. 1 shows a single-sided PSA tape.

FIG. 1 shows a single-sidedly adhesive pressure-sensitive adhesive tape (PSA tape) 1. The PSA tape 1 has an adhesive layer 2, produced by coating one of the above-described PSAs onto a carrier 3. The PSA coat weight is preferably between 10 and 200 g/m$^2$.

Provided additionally (not shown) may be a release film, which covers and protects the adhesive layer 2 before the PSA tape 1 is used. The release film is then removed before use from the adhesive layer 2.

Figure 2:
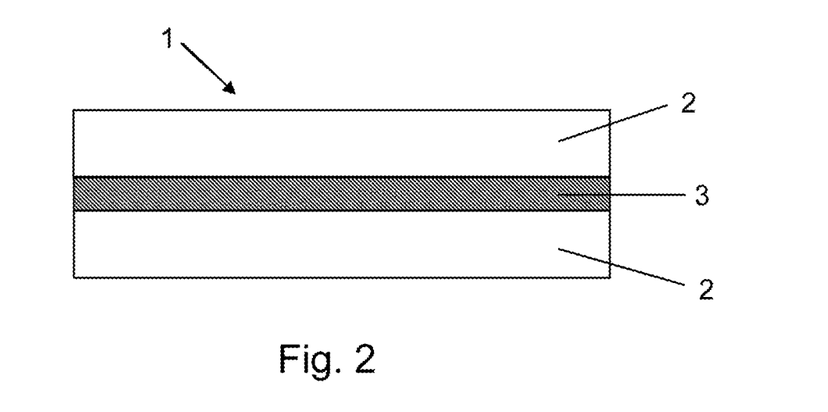
FIG. 2 shows a double-sided PSA tape.

The product construction shown in FIG. 2 shows a PSA tape 1 with a carrier 3, which is coated on either side with a PSA and thus has two adhesive layers 2. The PSA coat weight per side is again preferably between 10 and 200 g/m$^2$.

With this embodiment as well, at least one adhesive layer 2 is preferably lined with a release film. In the case of a wound adhesive tape, this one release film may possibly also line the second adhesive layer 2. It is also possible, however, for there to be a plurality of release films.

It is possible, furthermore, for the carrier film to be provided with one or more coatings. Moreover, only one side of the PSA tape may be equipped with the inventive PSA, and a different PSA may be used on the other side.

Figure 3:
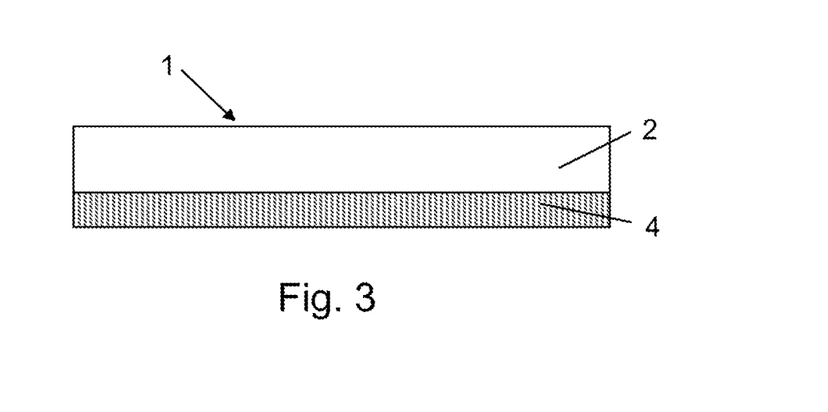
FIG. 3 shows a carrierless PSA tape (adhesive transfer tape).

The product construction shown in FIG. 3 shows a PSA tape 1 in the form of an adhesive transfer tape, in other words a carrierless PSA tape 1. For this construction, the PSA is coated single-sidedly onto a release film 4, thus forming a pressure-sensitively adhesive layer 2. The PSA coat weight here is customarily between 10 and 200 g/m$^2$. This pressure-sensitively adhesive layer 2 is optionally further lined on its second side with a further release film. For the use of the PSA tape, the release films are then removed.

As an alternative to release films it is also possible, for example, to use release papers or the like. In that case, however, the surface roughness of the release paper ought to be reduced, in order to realize a PSA side that is as smooth as possible.

In the text below, the invention will be elucidated in more detail with reference to a number of examples, without thereby wishing to impose any unnecessary restriction on the invention.

The pressure-sensitively adhesive, biodegradable, chemical reaction product was produced in each case by first weighing out the polyester polyols and mixing them in a customary heatable and evacuatable laboratory mixer (for example, from the company PC Laborsystem) under reduced pressure at a temperature of 70° C. for approximately two hours. Then the chain extender was added and was mixed in for 20 minutes without reduced pressure. After that, the remaining substances were added, in the proportions indicated in the individual examples, and were mixed in for 20 minutes. Lastly, the at least one aliphatic diisocyanate was added, and was mixed in homogeneously for 20 minutes. For completion of the reaction, the chemically reacting mixture was stored in a heating cabinet at 40° C. for 7 days. The proportions of the substances introduced for the chemical reaction were selected so as to produce the hydroxyl-functionalized polyurethane prepolymers, intended for subsequent crosslinking, always in an NCO/OH ratio of 0.7. Further pressure-sensitively adhesive, biodegradable, chemical reaction products were produced in an NCO/OH ratio of 0.9. The NCO/OH ratio refers to the ratio of the total number of isocyanate groups introduced for the chemical reaction to the total number of hydroxyl groups introduced for the chemical reaction.

The crosslinking was accomplished by first dissolving the prepared hydroxyl-functionalized polyurethane prepolymer in acetone. 100 g of prepolymer were always admixed with 25 g of acetone. Crosslinking took place either with Desmodur® N3300 or Desmodur® N3400. Crosslinking always took place to an extent such that the total NCO/OH ratio was always either 0.8 or 0.9. The total NCO/OH ratio refers to the ratio of the total number of all isocyanate groups to the total number of all hydroxyl groups introduced overall for the chemical reaction to form the pressure-sensitively adhesive, biodegradable product and for the subsequent chemical crosslinking to form the biodegradable PSA or bonding material.

Following the addition of the Desmodur® N3300 or Desmodur® N3400 to the acetone solution of hydroxyl-functionalized polyurethane prepolymer, the mixture was stirred for 5 minutes. The mixture, which at this point was chemically reacting, was subsequently coated during the reaction phase onto a PET film 36 μm thick and, in a second experiment, onto a siliconized PET film, coating taking place in each case by means of a commercial laboratory benchtop coater (for example, from SMO (Sondermaschinen Oschersleben GmbH)). The acetone was evaporated in a forced-air drying cabinet at 60° C. for 10 minutes. The slot width on coating was adjusted so as to produce a pressure-sensitively adhesive film 50 μm thick following evaporation of the solvent. The films free from the solvent were subsequently lined with siliconized PET film, and the reaction was completed by storing them in a heating cabinet at 40° C. for 7 days.

Table 1 lists the substances used for producing the pressure-sensitively adhesive, biodegradable, chemical reaction products of the invention and also the chemically cross-linked PSAs or bonding materials, in each case with trade name and manufacturer. The stated raw materials are all freely available commercially.

Molecular Weight $M_n$

The number-averaged average molecular weights $M_n$ were determined by means of gel permeation chromatography (GPC). The eluent used was TI-IF (tetrahydrofuran) with 0.1 vol % of trifluoroacetic acid. The measurements took place at 25° C. The pre-column used was PSS-SDV, 5 μ, $10^3$ Å, ID 8.0 mm ×50 mm. Separation took place using the columns PSS-SDV, 5 μ, $10^3$ and also $10^5$ and $10^6$ Å each with ID 8.0 mm ×300 mm. The sample concentration was 4 g/l, the flow rate 1.0 ml per minute. Measurement was made against PMMA standards.

Hydroxyl Number

The hydroxyl numbers were determined according to DIN 53240. According to this method, the hydroxyl number (OHN) is reported in the unit [mg KOH/g]. In order to

TABLE 1

Base materials used for producing the example specimens of the invention

| Trade name | Chemical designation/ description | Average number-averaged molecular weight $M_n$ | OH or NCO number (mmol OH/kg or mmol NCO/kg) | Functionality (f) | Manufacturer/ Supplier |
|---|---|---|---|---|---|
| Polyester diols | | | | | |
| Capa 2043 ® | Polycaprolactone diol, basis: 1,4-butanediol (starter), caprolactone | 400 | 4991 | 2 | Perstorp |
| Capa 2077A ® | Polycaprolactone diol, basis: 1,6-hexanediol (starter), caprolactone | 750 | 2674 | 2 | Perstorp |
| Desmophen 1652 ® | Polyester diol based on 1,4-butanediol, ethylene glycol, diethylene glycol, adipic acid | 2120 | 941 | 2 | Bayer |
| Polyester triols | | | | | |
| Bester 10 ® | Polyester triol based on diethylene glycol, trimethylolpropane, adipic acid | 2760 | 1069 | 3 | Dow Chemical |
| Chain extenders | | | | | |
| MP Diol ® | 2-Methyl-1,3-propanediol (CAS No.: 2163-42-0) | 90.12 | 22 193 | 2 | Lyondell |
| MPD ® | 3-Methyl-1,5-pentanediol (CAS No.: 4457-71-0) | 118.17 | 16 925 | 2 | Kuraray |
| Diethylene glycol | Diethylene glycol (CAS No.: 111-46-6) | 150.17 | 18 846 | 2 | Sigma-Aldrich |
| Catalyst | | | | | |
| Coscat 83 ® | Bismuth trisneodecanoate, CAS No: 34364-26-6 | | | | Caschem |
| Isocyanates | | | | | |
| Desmodur W ® | 4,4'-Diisocyanatodicyclohexyl-methane (CAS No.: 5124-30-1) | 262 | 7571 | 2 | Bayer |
| Hexamethylene diisocyanate | Hexamethylene diisocyanate (CAS No.: 822-06-0) | 168 | 11 891 | 2 | Sigma-Aldrich |
| Desmodur N 3300 ® | HDI trimer with polyfunctional fractions | about 680 | 5190 | about 3.4 | Bayer |
| Desmodur N 3400 ® | HDI dimer with polyfunctional fractions | about 480 | 5190 | about 2.5 | Bayer |

Test Methods

Unless otherwise indicated, the measurements are carried out under test conditions of 23±1° C. and 50±5% relative humidity.

The test methods below were used to characterize briefly the starting materials and also the specimens produced by the methods described.

simplify the formula calculations in the examples given, the hydroxyl numbers were converted to the unit [mmol OH/kg].

This was done according to the following formula:

OHN [mmol OH/kg]=OHN [mg KOH/g]×1000/56.1 where 56.1 is the molar mass of KOH.

Hydroxyl Functionality (f)

The hydroxyl functionality (f) was calculated from the number-averaged average molecular weight $M_n$ and from the OH number (OHN) in accordance with the following equation:

$$f = M_n[\text{g/mol}] \times \text{OHN [mmol OH/kg]}/10^6$$

Peel Adhesion

The peel adhesion (peel strength) was tested in accordance with PSTC-1. A strip of the PSA tape 2 cm wide, consisting of the PET film 36 μm thick with the pressure-sensitively adhesive film 50 μm thick applied to it, is adhered to the test plate by being rolled over back and forth five times with a 5 kg roller. The test plate is clamped in, and the self-adhesive strip is peeled via its free end at a peel angle of 180° and at a speed of 300 mm/min, using a tensile testing machine. The force required to accomplish peeling is ascertained. The results are averaged over three measurements and reported as standardized for the width of the strip in N/cm.

The test plates were steel plates and ABS plates.

The peel adhesion measurements took place with freshly adhered samples and with samples which had been stored in a conditioning chamber after the bonds had been implemented. The storage conditions in a first experimental series were 3 weeks at 60° C. In a second experimental series, storage took place under climatic cycling with 7 cycles each of 8 hours at 40° C./98% relative humidity and 16 hours at 23° C./98% relative humidity.

Shear Test

The shear test took place in accordance with test protocol PSTC-107. In accordance with this method, the assembly of PSA layer and polyester film is applied to the substrate (steel), pressed on four times with a 2 kg weight, and then exposed to a constant shearing load. The holding power (time for which shearing is withstood) in minutes is ascertained.

The bond area was 13×20 mm² in each case. The shearing load on this bond area was 1 kg.

Determination of Biodegradability

The biodegradability by composting was determined in accordance with DIN EN 13432. This is a chemical test in which over the six-month test duration, a degree of degradation of 90% must be achieved relative to a reference substance in the presence of microorganisms or fungi. The conditions (temperature, oxygen content, and moisture level) are precisely defined. Degradation must take place to form water, carbon dioxide, and biomass. There is a subsequent chemical analysis and evaluation of the quality of the compost.

Likewise as part of this investigation, there is a test for disintegration behavior. The disintegration refers to the physical breakdown of a material into very small fragments. Here, at least 90% of the plastic must have been broken down into particles smaller than 2 mm within 12 weeks. Only if both tests are passed is a substance classified as "biodegradable" in accordance with the DIN standard.

Owing to the high level of complexity and the resultant high costs, this test took place only on certain selected examples.

Determination of Disintegration Behavior

For all of the test specimens, there was a separate test of the disintegration behavior in accordance with DIN EN ISO 20200.

This standard describes the determination of the disintegrability (degree of disintegration) of polymers under model composting conditions on the laboratory scale.

The investigations were carried out using commercial compost earth, in this case the compost earth with the brand name Tangocomp® from VKN-Vertriebsgesellschaft Kompostprodukte Nord mbH. The marketing company is located in Tangstedt, in Schleswig-Holstein, and obtains its raw compost materials from the area around Hamburg. The moisture content of the compost earth was adjusted to 55 to 60%. To determine the moisture content, three samples of compost earth each of 10 g were dried at 120° C. for 2 hours, followed by determinations of the moisture loss and hence the water content of the earth. A moisture deficit was made up in the form of unchlorinated mains water.

First of all, 50 g of the compost earth adjusted to a moisture content of 60% were weighed out into a 250 ml PE beaker. Placed subsequently onto this first layer of earth was a section of the sample under investigation, measuring approximately 9 cm². A second layer of compost earth, again 50 g in weight, was then placed onto the sample. The PE beaker was closed with a lid. To ventilate the compost, the lid had been provided beforehand with three holes each with a diameter of 2.0 mm. The sample prepared in this way was stored at 58±2° C. for not more than 90 days, with the water loss being compensated by addition of water every 2 to 3 days. Once a week the progress of disintegration of the samples was ascertained by visual inspection, and the time taken for complete disintegration (disintegration time) was recorded.

The invention is elucidated in more detail below by a number of examples, without wishing thereby to restrict the invention.

EXAMPLES

Example 1

The pressure-sensitively adhesive, biodegradable, chemical reaction product of the invention (Prepolymer 1) has the following composition:

Prepolymer 1:

| Raw material | Weight fraction [wt %] | Number of OH or NCO groups introduced, based on the percentage weight fraction |
|---|---|---|
| Desmophen 1652 ® | 58.8 | 55.3 mmol OH |
| MP Diol ® | 2.5 | 55.3 mmol OH |
| Bester 10 ® | 25.8 | 27.7 mmol OH |
| Coscat 83 ® | 0.1 | |
| Desmodur W ® | 12.8 | 96.8 mmol NCO |
| Total | 100.0 | |

The weight fraction of Desmodur W here is calculated such that the NCO/OH ratio of the prepolymer is 0.7.

Crosslinking Step:

Example 1a

| Raw material | Weight fraction [g] | Number of OH or NCO groups introduced, based on the weight fraction |
|---|---|---|
| Prepolymer 1 | 100.0 | 138.3 mmol OH |
|  |  | 96.8 mmol NCO |
| Acetone | 25.0 |  |
| Desmodur N 3300 ® | 2.7 | 13.8 mmol NCO |

The weight fraction of Desmodur N 3300® is calculated such that the overall NCO/OH ratio is 0.8. Since the NCO groups introduced into the prepolymer at the time when the crosslinking step is implemented are considered to have already undergone full conversion, the Desmodur N 3300®/Prepolymer 1 NCO/OH ratio is therefore: 13.8/(138.3−96.8)=0.33.

Example 1b

| Raw material | Weight fraction [g] | Number of OH or NCO groups, based on the weight fraction |
|---|---|---|
| Prepolymer 1 | 100.0 | 138.3 mmol OH |
|  |  | 96.8 mmol NCO |
| Acetone | 25.0 |  |
| Desmodur N 3300 ® | 5.3 | 27.7 mmol NCO |

The weight fraction of Desmodur N 3300® is calculated such that the overall NCO/OH ratio is 0.9. Since the NCO groups introduced into the prepolymer at the time when the crosslinking step is implemented are considered to have already undergone full conversion, the Desmodur N 3300®/Prepolymer 1 NCO/OH ratio is therefore: 27.7/(138.3−96.8)=0.67.

Example 2

The pressure-sensitively adhesive, biodegradable, chemical reaction product of the invention (Prepolymer 2) has the following composition:

Prepolymer 2:

| Raw material | Weight fraction [wt %] | Number of OH or NCO groups introduced, based on the percentage weight fraction |
|---|---|---|
| Desmophen 1652 ® | 51.3 | 48.3 mmol OH |
| MP Diol ® | 3.6 | 80.5 mmol OH |
| Bester 10 ® | 30.1 | 32.2 mmol OH |
| Coscat 83 ® | 0.1 |  |
| Desmodur W ® | 14.9 | 112.6 mmol NCO |
| Total | 100.0 |  |

The weight fraction of Desmodur W here is calculated such that the NCO/OH ratio of the prepolymer is 0.7.

Crosslinking Step:

Example 2a

| Raw material | Weight fraction [g] | Number of OH or NCO groups introduced, based on the weight fraction |
|---|---|---|
| Prepolymer 2 | 100.0 | 161.0 mmol OH |
|  |  | 112.6 mmol NCO |
| Acetone | 25.0 |  |
| Desmodur N 3300 ® | 3.1 | 16.1 mmol NCO |

The weight fraction of Desmodur N 3300 is calculated such that the overall NCO/OH ratio is 0.8. Since the NCO groups introduced into the prepolymer at the time when the crosslinking step is implemented are considered to have already undergone full conversion, the Desmodur N 3300®/Prepolymer 2 NCO/OH ratio is therefore: 16.1/(161.0−112.6)=0.33.

Example 2b

| Raw material | Weight fraction [g] | Number of OH or NCO groups, based on the weight fraction |
|---|---|---|
| Prepolymer 2 | 100.0 | 161.0 mmol OH |
|  |  | 112.6 mmol NCO |
| Acetone | 25.0 |  |
| Desmodur N 3300 ® | 6.2 | 32.2 mmol NCO |

The weight fraction of Desmodur N 3300 is calculated such that the overall NCO/OH ratio is 0.9. Since the NCO groups introduced into the prepolymer at the time when the crosslinking step is implemented are considered to have already undergone full conversion, the Desmodur N 3300®/Prepolymer 2 NCO/OH ratio is therefore: 32.2/(161.0−112.6)=0.67.

Example 3

The pressure-sensitively adhesive, biodegradable, chemical reaction product of the invention (Prepolymer 3) has the following composition:

Prepolymer 3:

| Raw material | Weight fraction [wt %] | Number of OH or NCO groups introduced, based on the percentage weight fraction |
|---|---|---|
| Desmophen 1652 ® | 40.9 | 38.5 mmol OH |
| MP Diol ® | 5.2 | 115.5 mmol OH |
| Bester 10 ® | 36.0 | 38.5 mmol OH |
| Coscat 83 ® | 0.1 |  |
| Desmodur W ® | 17.8 | 134.7 mmol NCO |
| Total | 100.0 |  |

The weight fraction of Desmodur W here is calculated such that the NCO/OH ratio of the prepolymer is 0.7.

Crosslinking Step:

Example 3a

| Raw material | Weight fraction [g] | Number of OH or NCO groups introduced, based on the weight fraction |
|---|---|---|
| Prepolymer 3 | 100.0 | 192.5 mmol OH |
|  |  | 134.7 mmol NCO |
| Acetone | 25.0 |  |
| Desmodur N 3300 ® | 3.7 | 19.2 mmol NCO |

The weight fraction of Desmodur N 3300® is calculated such that the overall NCO/OH ratio is 0.8. Since the NCO groups introduced into the prepolymer at the time when the crosslinking step is implemented are considered to have already undergone full conversion, the Desmodur N 3300®/Prepolymer 3 NCO/OH ratio is therefore: 19.2/(192.5−134.7)=0.33.

Example 3b

| Raw material | Weight fraction [g] | Number of OH or NCO groups, based on the weight fraction |
|---|---|---|
| Prepolymer 3 | 100.0 | 192.5 mmol OH |
|  |  | 134.7 mmol NCO |
| Acetone | 25.0 |  |
| Desmodur N 3300 ® | 7.4 | 38.5 mmol NCO |

The weight fraction of Desmodur N 3300® is calculated such that the overall NCO/OH ratio is 0.9. Since the NCO groups introduced into the prepolymer at the time when the crosslinking step is implemented are considered to have already undergone full conversion, the Desmodur N 3300®/Prepolymer 3 NCO/OH ratio is therefore: 38.5/(192.5−134.7)=0.67.

Example 4

The pressure-sensitively adhesive, biodegradable, chemical reaction product of the invention (Prepolymer 4) has the following composition:

Prepolymer 4:

| Raw material | Weight fraction [wt %] | Number of OH or NCO groups introduced, based on the percentage weight fraction |
|---|---|---|
| Desmophen 1652 ® | 69.7 | 65.7 mmol OH |
| MP Diol ® | 3.0 | 65.7 mmol OH |
| Bester 10 ® | 13.7 | 14.6 mmol OH |
| Coscat 83 ® | 0.1 |  |
| Desmodur W ® | 13.5 | 102.2 mmol NCO |
| Total | 100.0 |  |

The weight fraction of Desmodur W here is calculated such that the NCO/OH ratio of the prepolymer is 0.7.

Crosslinking Step:

Example 4a

| Raw material | Weight fraction [g] | Number of OH or NCO groups introduced, based on the weight fraction |
|---|---|---|
| Prepolymer 4 | 100.0 | 146.0 mmol OH |
|  |  | 102.2 mmol NCO |
| Acetone | 25.0 |  |
| Desmodur N 3300 ® | 2.8 | 14.6 mmol NCO |

The weight fraction of Desmodur N 3300® is calculated such that the overall NCO/OH ratio is 0.8. Since the NCO groups introduced into the prepolymer at the time when the crosslinking step is implemented are considered to have already undergone full conversion, the Desmodur N 3300®/Prepolymer 4 NCO/OH ratio is therefore: 14.6/(146.0−102.2)=0.33.

Example 4b

| Raw material | Weight fraction [g] | Number of OH or NCO groups, based on the weight fraction |
|---|---|---|
| Prepolymer 4 | 100.0 | 146.0 mmol OH |
|  |  | 102.2 mmol NCO |
| Acetone | 25.0 |  |
| Desmodur N 3300 ® | 5.6 | 29.2 mmol NCO |

The weight fraction of Desmodur N 3300® is calculated such that the overall NCO/OH ratio is 0.9. Since the NCO groups introduced into the prepolymer at the time when the crosslinking step is implemented are considered to have already undergone full conversion, the Desmodur N 3300®/Prepolymer 4 NCO/OH ratio is therefore: 29.2/(146.0−102.2)=0.67.

Example 5

The pressure-sensitively adhesive, biodegradable, chemical reaction product of the invention (Prepolymer 5) has the following composition:

Prepolymer 5:

| Raw material | Weight fraction [wt %] | Number of OH or NCO groups introduced, based on the percentage weight fraction |
|---|---|---|
| Desmophen 1652 ® | 69.2 | 65.1 mmol OH |
| MPD ® | 3.8 | 65.1 mmol OH |
| Bester 10 ® | 13.5 | 14.5 mmol OH |
| Coscat 83 ® | 0.1 |  |
| Desmodur W ® | 13.4 | 101.2 mmol NCO |
| Total | 100.0 |  |

The weight fraction of Desmodur W here is calculated such that the NCO/OH ratio of the prepolymer is 0.7.

Crosslinking Step:

Example 5a

| Raw material | Weight fraction [g] | Number of OH or NCO groups introduced, based on the weight fraction |
|---|---|---|
| Prepolymer 5 | 100.0 | 144.7 mmol OH |
|  |  | 101.2 mmol NCO |
| Acetone | 25.0 |  |
| Desmodur N 3300 ® | 2.8 | 14.5 mmol NCO |

The weight fraction of Desmodur N 3300 is calculated such that the overall NCO/OH ratio is 0.8. Since the NCO groups introduced into the prepolymer at the time when the crosslinking step is implemented are considered to have already undergone full conversion, the Desmodur N 3300®/ Prepolymer 5 NCO/OH ratio is therefore: 14.5/(144.6−101.2)=0.33.

Example 5b

| Raw material | Weight fraction [g] | Number of OH or NCO groups, based on the weight fraction |
|---|---|---|
| Prepolymer 5 | 100.0 | 144.7 mmol OH |
|  |  | 101.2 mmol NCO |
| Acetone | 25.0 |  |
| Desmodur N 3300 ® | 5.6 | 28.9 mmol NCO |

The weight fraction of Desmodur N 3300 is calculated such that the overall NCO/OH ratio is 0.9. Since the NCO groups introduced into the prepolymer at the time when the crosslinking step is implemented are considered to have already undergone full conversion, the Desmodur N 3300®/ Prepolymer 5 NCO/OH ratio is therefore: 28.9/(144.6−101.2)=0.67.

Example 6

The pressure-sensitively adhesive, biodegradable, chemical reaction product of the invention (Prepolymer 6) has the following composition:

Prepolymer 6:

| Raw material | Weight fraction [wt %] | Number of OH or NCO groups introduced, based on the percentage weight fraction |
|---|---|---|
| Desmophen 1652 ® | 58.5 | 55.1 mmol OH |
| Diethylene glycol | 2.9 | 55.1 mmol OH |
| Bester 10 ® | 25.8 | 27.5 mmol OH |
| Coscat 83 ® | 0.1 |  |
| Desmodur W ® | 12.7 | 96.3 mmol NCO |
| Total | 100.0 |  |

The weight fraction of Desmodur W here is calculated such that the NCO/OH ratio of the prepolymer is 0.7.

Crosslinking Step:

Example 6a

| Raw material | Weight fraction [g] | Number of OH or NCO groups introduced, based on the weight fraction |
|---|---|---|
| Prepolymer 6 | 100.0 | 137.7 mmol OH |
|  |  | 96.3 mmol NCO |
| Acetone | 25.0 |  |
| Desmodur N 3300 ® | 2.7 | 13.8 mmol NCO |

The weight fraction of Desmodur N 3300® is calculated such that the overall NCO/OH ratio is 0.8. Since the NCO groups introduced into the prepolymer at the time when the crosslinking step is implemented are considered to have already undergone full conversion, the Desmodur N 3300®/ Prepolymer 6 NCO/OH ratio is therefore: 13.8/(137.7−96.3)=0.33.

Example 6b

| Raw material | Weight fraction [g] | Number of OH or NCO groups, based on the weight fraction |
|---|---|---|
| Prepolymer 6 | 100.0 | 137.7 mmol OH |
|  |  | 96.3 mmol NCO |
| Acetone | 25.0 |  |
| Desmodur N 3300 ® | 5.3 | 27.5 mmol NCO |

The weight fraction of Desmodur N 3300® is calculated such that the overall NCO/OH ratio is 0.9. Since the NCO groups introduced into the prepolymer at the time when the crosslinking step is implemented are considered to have already undergone full conversion, the Desmodur N 3300®/ Prepolymer 6 NCO/OH ratio is therefore: 27.5/(137.7−96.3)=0.67.

Example 7

The pressure-sensitively adhesive, biodegradable, chemical reaction product of the invention (Prepolymer 7) has the following composition:

Prepolymer 7:

| Raw material | Weight fraction [wt %] | Number of OH or NCO groups introduced, based on the percentage weight fraction |
|---|---|---|
| Capa 2043 ® | 30.0 | 149.8 mmol OH |
| Diethylene glycol | 8.0 | 149.8 mmol OH |
| Bester 10 ® | 31.2 | 33.3 mmol OH |
| Coscat 83 ® | 0.1 |  |
| Desmodur W ® | 30.7 | 233.1 mmol NCO |
| Total | 100.0 |  |

The weight fraction of Desmodur W here is calculated such that the NCO/OH ratio of the prepolymer is 0.7.

Crosslinking Step:

Example 7a

| Raw material | Weight fraction [g] | Number of OH or NCO groups introduced, based on the weight fraction |
|---|---|---|
| Prepolymer 7 | 100.0 | 333.0 mmol OH |
|  |  | 233.1 mmol NCO |
| Acetone | 25.0 |  |
| Desmodur N 3300 ® | 6.4 | 33.3 mmol NCO |

The weight fraction of Desmodur N 3300® is calculated such that the overall NCO/OH ratio is 0.8. Since the NCO groups introduced into the prepolymer at the time when the crosslinking step is implemented are considered to have already undergone full conversion, the Desmodur N 3300®/Prepolymer 7 NCO/OH ratio is therefore: 33.3/(333.0−233.1)=0.33.

Example 7b

| Raw material | Weight fraction [g] | Number of OH or NCO groups, based on the weight fraction |
|---|---|---|
| Prepolymer 7 | 100.0 | 333.0 mmol OH |
|  |  | 233.1 mmol NCO |
| Acetone | 25.0 |  |
| Desmodur N 3300 ® | 12.8 | 66.6 mmol NCO |

The weight fraction of Desmodur N 3300® is calculated such that the overall NCO/OH ratio is 0.9. Since the NCO groups introduced into the prepolymer at the time when the crosslinking step is implemented are considered to have already undergone full conversion, the Desmodur N 3300®/Prepolymer 7 NCO/OH ratio is therefore: 66.6/(333.0−233.1)=0.67.

Example 8

The pressure-sensitively adhesive, biodegradable, chemical reaction product of the invention (Prepolymer 8) has the following composition:

Prepolymer 8:

| Raw material | Weight fraction [wt %] | Number of OH or NCO groups introduced, based on the percentage weight fraction |
|---|---|---|
| Capa 2077A ® | 48.8 | 130.5 mmol OH |
| Diethylene glycol | 6.9 | 130.5 mmol OH |
| Bester 10 ® | 27.1 | 29.0 mmol OH |
| Coscat 83 ® | 0.1 |  |
| Hexamethylene diisocyanate | 17.1 | 202.9 mmol NCO |
| Total | 100.0 |  |

The weight fraction of hexamethylene diisocyanate here is calculated such that the NCO/OH ratio of the prepolymer is 0.7.

Crosslinking Step:

Example 8a

| Raw material | Weight fraction [g] | Number of OH or NCO groups introduced, based on the weight fraction |
|---|---|---|
| Prepolymer 8 | 100.0 | 289.9 mmol OH |
|  |  | 202.9 mmol NCO |
| Acetone | 25.0 |  |
| Desmodur N 3300 ® | 5.6 | 29.0 mmol NCO |

The weight fraction of Desmodur N 3300® is calculated such that the overall NCO/OH ratio is 0.8. Since the NCO groups introduced into the prepolymer at the time when the crosslinking step is implemented are considered to have already undergone full conversion, the Desmodur N 3300®/Prepolymer 8 NCO/OH ratio is therefore: 29.0/(289.9−202.9)=0.33.

Example 8b

| Raw material | Weight fraction [g] | Number of OH or NCO groups, based on the weight fraction |
|---|---|---|
| Prepolymer 8 | 100.0 | 289.9 mmol OH |
|  |  | 202.9 mmol NCO |
| Acetone | 25.0 |  |
| Desmodur N 3300 ® | 11.2 | 58.0 mmol NCO |

The weight fraction of Desmodur N 3300® is calculated such that the overall NCO/OH ratio is 0.9. Since the NCO groups introduced into the prepolymer at the time when the crosslinking step is implemented are considered to have already undergone full conversion, the Desmodur N 3300®/Prepolymer 8 NCO/OH ratio is therefore: 58.0/(289.9−202.9)=0.67.

Example 9

The pressure-sensitively adhesive, biodegradable, chemical reaction product of the invention (Polymer 9) has the following composition:

Polymer 9:

| Raw material | Weight fraction [wt %] | Number of OH or NCO groups introduced, based on the percentage weight fraction |
|---|---|---|
| Desmophen 1652 ® | 66.9 | 62.9 mmol OH |
| Diethylene glycol | 3.3 | 62.9 mmol OH |
| Bester 10 ® | 13.1 | 14.0 mmol OH |
| Coscat 83 ® | 0.1 |  |
| Desmodur W ® | 16.6 | 125.8 mmol NCO |
| Total | 100.0 |  |

The weight fraction of Desmodur W here is calculated such that the NCO/OH ratio of the polymer is 0.9. No further crosslinking took place.

Example 10

The pressure-sensitively adhesive, biodegradable, chemical reaction product of the invention (Prepolymer 10) has the following composition:

Prepolymer 10:

| Raw material | Weight fraction [wt %] | Number of OH or NCO groups introduced, based on the percentage weight fraction |
|---|---|---|
| Desmophen 1652 ® | 58.8 | 55.3 mmol OH |
| MP Diol ® | 2.5 | 55.3 mmol OH |
| Bester 10 ® | 25.8 | 27.7 mmol OH |
| Coscat 83 ® | 0.1 | |
| Desmodur W ® | 12.8 | 96.8 mmol NCO |
| Total | 100.0 | |

The weight fraction of Desmodur W here is calculated such that the NCO/OH ratio of the prepolymer is 0.7.

Crosslinking Step:

Example 10a

| Raw material | Weight fraction [g] | Number of OH or NCO groups introduced, based on the weight fraction |
|---|---|---|
| Prepolymer 10 | 100.0 | 138.3 mmol OH |
| | | 96.8 mmol NCO |
| Acetone | 25.0 | |
| Desmodur N 3400 ® | 2.7 | 13.8 mmol NCO |

The weight fraction of Desmodur N 3400® is calculated such that the overall NCO/OH ratio is 0.8. Since the NCO groups introduced into the prepolymer at the time when the crosslinking step is implemented are considered to have already undergone full conversion, the Desmodur N 3400®/Prepolymer 10 NCO/OH ratio is therefore: 13.8/(138.3−96.8)=0.33.

Example 11

The pressure-sensitively adhesive, biodegradable, chemical reaction product of the invention (Prepolymer 11) has the following composition:

Prepolymer 11:

| Raw material | Weight fraction [wt %] | Number of OH or NCO groups introduced, based on the percentage weight fraction |
|---|---|---|
| Capa 2043 ® | 29.7 | 148.5 mmol OH |
| MPD ® | 8.8 | 148.5 mmol OH |
| Bester 10 ® | 30.9 | 33.0 mmol OH |
| Coscat 83 ® | 0.1 | |
| Desmodur W ® | 30.5 | 231.0 mmol NCO |
| Total | 100.0 | |

The weight fraction of Desmodur W here is calculated such that the NCO/OH ratio of the prepolymer is 0.7.

Crosslinking Step:

Example 11a

| Raw material | Weight fraction [g] | Number of OH or NCO groups introduced, based on the weight fraction |
|---|---|---|
| Prepolymer 11 | 100.0 | 330.0 mmol OH |
| | | 231.0 mmol NCO |
| Acetone | 25.0 | |
| Desmodur N 3400 ® | 6.4 | 33.0 mmol NCO |

The weight fraction of Desmodur N 3400® is calculated such that the overall NCO/OH ratio is 0.8. Since the NCO groups introduced into the prepolymer at the time when the crosslinking step is implemented are considered to have already undergone full conversion, the Desmodur N 3400®/Prepolymer 11 NCO/OH ratio is therefore: 33.0/(330.0−231.0)=0.33.

Results

| Example/sample | Peel adhesion (steel) [N/cm] | Peel adhesion (ABS) [N/cm] | Holding power (steel) [Minutes] | Peel adhesion (steel) after 3 weeks 60° C. storage [N/cm] | Peel adhesion (ABS) after 3 weeks 60° C. storage [N/cm] | Peel adhesion (steel) after 7 cycles of climatic cycling storage [N/cm] | Peel adhesion (ABS) after 7 cycles of climatic cycling storage [N/cm] | Biodegradability to DIN EN 13432 | Disintegration time [days] |
|---|---|---|---|---|---|---|---|---|---|
| 1a | 2.8 | 4.0 | 170 | 3.0 | 4.2 | 2.2 | 3.6 | complies | <70 |
| 1b | 0.3 | 1.3 | >10 000 | 0.4 | 1.2 | 0.3 | 1.1 | complies | <84 |
| 2a | 3.2 | 3.5 | >10 000 | 3.3 | 3.1 | 3.0 | 3.9 | complies | <63 |
| 2b | 0.4 | 0.3 | >10 000 | 0.4 | 0.4 | 0.3 | 0.2 | complies | <77 |
| 3a | 4.3 | 3.3 | >10 000 | 4.8 | 3.3 | 4.1 | 3.1 | n.d. | <77 |
| 3b | 1.3 | 1.6 | >10 000 | 1.2 | 1.7 | 1.9 | 1.9 | n.d. | <84 |
| 4a | 3.9 | 3.2 | 4200 | 3.4 | 3.0 | 3.3 | 3.7 | n.d. | <77 |
| 4b | 1.9 | 1.9 | >10 000 | 2.6 | 2.0 | 2.0 | 2.3 | n.d. | <84 |
| 5a | 2.3 | 2.2 | 3500 | 2.5 | 2.6 | 2.6 | 2.1 | complies | <63 |
| 5b | 1.4 | 1.7 | >10 000 | 1.3 | 1.6 | 1.5 | 1.7 | complies | <77 |
| 6a | 3.0 | 2.8 | 5300 | 3.3 | 2.9 | 3.1 | 2.9 | n.d. | <56 |
| 6b | 0.9 | 1.2 | >10 000 | 1.3 | 1.0 | 0.7 | 1.0 | n.d. | <63 |
| 7a | 8.8 | 3.6 | 280 | 9.5 | 3.5 | 7.4 | 3.9 | n.d. | <49 |
| 7b | 4.1 | 2.8 | 8500 | 3.8 | 2.2 | 3.6 | 2.9 | n.d. | <63 |
| 8a | 7.6 | 4.3 | 730 | 8.2 | 4.0 | 7.0 | 4.0 | n.d. | <56 |
| 8b | 3.0 | 2.6 | >10 000 | 3.3 | 2.9 | 2.5 | 2.2 | n.d. | <70 |
| 9 | 3.2 | 2.5 | 1500 | 4.2 | 2.6 | 3.3 | 2.0 | complies | <77 |
| 10a | 3.7 | 4.6 | 900 | 5.0 | 4.1 | 3.7 | 4.1 | n.d. | <63 |
| 11a | 7.8 | 6.2 | 450 | 7.3 | 6.7 | 7.2 | 5.3 | n.d. | <70 | n.d. = not determined

For all of the peel adhesion measurements, the fracture patterns were always adhesive. There were no deposits and no discolorations observed on the test plates. With some of the specimens stored in climatic cycling, with a sheer resistance of less than 10 000 minutes, slight residues were observed in the edge region of the adhesive tape on the test plates after the adhesive tape had been peeled away.

The invention claimed is:

1. A biodegradable, pressure sensitive adhesive based on the chemical reaction product of:
    one or more of a first aliphatic polyester polyol having a hydroxyl functionality of between >2 and <4;
    one or more of a second aliphatic polyester polyol having a hydroxyl functionality of between ≤2 and >1;
    one or more chain extenders having dual hydroxyl functionalities and having a molecular weight of ≤200 g/mol, and
    one or more aliphatic diisocyanates,
    in which the ratio of the total number of isocyanate groups to the total number of hydroxyl groups in the materials introduced in the chemical reaction to yield the chemical reaction product is between ≥0.4 and <1.0.

2. The biodegradable, pressure sensitive adhesive according to claim 1, which is a hydroxyl-functionalized polyurethane hotmelt prepolymer.

3. The, biodegradable, pressure sensitive adhesive according to claim 1, wherein at least one of the aliphatic polyester polyols has a hydroxyl number of between ≥200 mmol OH/kg and ≤2000 mmol OH/kg.

4. The biodegradable, pressure sensitive adhesive according to claim 1, wherein at least one of the first aliphatic polyester polyols has a hydroxyl number of between ≥200 mmol OH/kg and ≤2000 mmol OH/kg.

5. The biodegradable, pressure sensitive adhesive according to claim 1, wherein the percentage of hydroxyl groups originating from the first aliphatic polyester polyols is at least 2.5% of all hydroxyl groups introduced in forming the biodegradable, pressure sensitive adhesive.

6. The biodegradable, pressure sensitive adhesive according to claim 1, wherein:
    at least one of the first aliphatic polyester polyols has a hydroxyl number of between ≥200 mmol OH/kg and ≤2000 mmol OH/kg; and,
    at least one of the second aliphatic polyester polyols has a hydroxyl number of between ≥200 mmol OH/kg and ≤8000 mmol OH/kg, and the percentage of hydroxyl groups originating from the first aliphatic polyester polyols is between 2.5% inclusive and 50% inclusive, based on all hydroxyl groups introduced for forming the biodegradable, pressure sensitive adhesive.

7. The biodegradable, pressure sensitive adhesive according to claim 1, wherein:
    at least one of the first aliphatic polyester polyols has a hydroxyl number of between ≥200 mmol OH/kg and ≤2000 mmol OH/kg; and,
    at least one of the second aliphatic polyester polyols has a hydroxyl number of between ≥200 mmol OH/kg and ≤8000 mmol OH/kg; and,
    and the percentage of hydroxyl groups originating from the aliphatic polyester polyols having a hydroxyl functionality of between greater than two and less than four and a hydroxyl number of between greater than or equal to 200 mmol OH/kg and less than or equal to 2000 mmol OH/kg is between 2.5% inclusive and 50% inclusive of all hydroxyl groups introduced for forming the pressure-sensitively adhesive, biodegradable, chemical reaction product.

8. The biodegradable, pressure sensitive adhesive according to claim 1, wherein at least one of the aliphatic polyester polyols is a polycaprolactone polyol.

9. The biodegradable, pressure sensitive adhesive according to claim 1, wherein at least one of the aliphatic polyester polyols is an adipate which comprises ethylene glycol or diethylene glycol as monomer unit.

10. The biodegradable, pressure sensitive adhesive according to claim 1, wherein at least one of the aliphatic diisocyanates is 4,4'-diisocyanatodicyclohexylmethane or hexamethylene diisocyanate.

11. The biodegradable, pressure sensitive adhesive according to claim 1, wherein the chain extender is selected from: 2-methyl-1,3-propanediol, 3-methyl-1,5-pentanediol, ethylene glycol, diethylene glycol, triethylene glycol and, tetraethylene glycol.

12. A biodegradable pressure-sensitive adhesive or a bonding material which comprises a biodegradable, pressure sensitive adhesive based on the chemical reaction product according to claim 1.

13. The biodegradable pressure-sensitive adhesive or bonding material according to claim 12, wherein the chemical crosslinking is accomplished by reacting the biodegradable, pressure sensitive adhesive based with a diisocyanate, triisocyanate or higher-functionality isocyanate or with a mixture of said isocyanates, the ratio of the total number of all isocyanate groups to the total number of all hydroxyl groups in the materials introduced overall in the chemical reaction to yield the biodegradable, pressure sensitive adhesive or bonding material is <1.0.

14. A method for producing a biodegradable, pressure sensitive adhesive according to claim 1, wherein the reaction takes place in the absence of a solvent, or the reaction takes place in an organic solvent, or the reaction takes place in an aqueous medium.

15. A single-sided or double-sided pressure-sensitive adhesive tape or in a single-sidedly or double-sidedly adhering cling film which comprises a biodegradable, pressure sensitive adhesive according to claim 1.

16. The biodegradable, pressure sensitive adhesive based on the chemical reaction product according to claim 1, in which the ratio of the total number of isocyanate groups to the total number of hydroxyl groups in the materials introduced in the chemical reaction to produce the biodegradable, pressure sensitive adhesive based on the chemical reaction product is between ≥0.6 and ≤0.9.

17. The biodegradable, pressure sensitive adhesive according to claim 6, wherein the percentage of hydroxyl groups originating from the first aliphatic polyester polyols have a hydroxyl number of between ≥200 mmol OH/kg and ≤2000 mmol OH/kg is between 5.0% inclusive and 40% inclusive, based on all hydroxyl groups introduced into the reaction for forming the biodegradable, pressure sensitive adhesive.

18. The biodegradable, pressure sensitive adhesive according to claim 7, wherein:
    the percentage of hydroxyl groups originating from the aliphatic polyester polyols having a hydroxyl functionality of between greater than two and less than four and a hydroxyl number of between greater than or equal to 200 mmol OH/kg and less than or equal to 2000 mmol OH/kg is between 5.0% inclusive and 40% inclusive of all hydroxyl groups introduced for forming the pressure-sensitively adhesive, biodegradable, chemical reaction product.

19. A method for producing the biodegradable pressure-sensitive adhesive or the bonding material according to claim 12, wherein the method takes place in the absence of a solvent, or the method takes place in the presence of an organic solvent, or the method takes place in an aqueous medium.

20. The biodegradable, pressure sensitive adhesive according to claim 10, wherein at least one of the aliphatic diisocyanates is 4,4'-diisocyanatodicyclohexylmethane.

21. The biodegradable, pressure sensitive adhesive according to claim 11, wherein the chain extender is selected from: diethylene glycol, triethylene glycol and tetraethylene glycol.

* * * * *